US012608586B2

(12) United States Patent
Zhao

(10) Patent No.: US 12,608,586 B2
(45) Date of Patent: Apr. 21, 2026

(54) PARAMETER SHARING DECODER PAIR FOR AUTO COMPOSING

(71) Applicant: Oracle International Corporation, Redwood Shores, CA (US)

(72) Inventor: Xu Zhao, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1249 days.

(21) Appl. No.: 17/086,271

(22) Filed: Oct. 30, 2020

(65) Prior Publication Data

US 2021/0133535 A1 May 6, 2021

Related U.S. Application Data

(60) Provisional application No. 62/930,485, filed on Nov. 4, 2019.

(51) Int. Cl.
*G06N 3/04* (2023.01)
*G06N 3/063* (2023.01)

(52) U.S. Cl.
CPC .............. *G06N 3/04* (2013.01); *G06N 3/063* (2013.01)

(58) Field of Classification Search
CPC .......... G06N 3/04; G06N 3/063; G06N 3/044; G06N 3/045; G06N 3/084; G06F 40/56
See application file for complete search history.

(56) References Cited

U.S. PATENT DOCUMENTS

| | | | | |
|---|---|---|---|---|
| 11,295,081 B1 * | 4/2022 | Federico | .................. | G06N 3/08 |
| 11,580,145 B1 * | 2/2023 | Kumar | ................... | G06N 3/092 |
| 11,604,956 B2 * | 3/2023 | Bradbury | .............. | G06N 3/047 |
| 2019/0130249 A1 * | 5/2019 | Bradbury | .............. | G06N 3/084 |
| 2019/0130273 A1 * | 5/2019 | Keskar | ................... | G06F 40/47 |
| 2019/0155234 A1 * | 5/2019 | Devi | ....................... | H02J 3/004 |

(Continued)

OTHER PUBLICATIONS

Dataset for Couplets, GitHub, Available Online at https://github.com/wb14123/couplet-dataset, Accessed from Internet on: Nov. 3, 2020, 2 pages.

(Continued)

*Primary Examiner* — Ryan C Vaughn
*Assistant Examiner* — Tri T Nguyen
(74) *Attorney, Agent, or Firm* — Kilpatrick Townsend & Stockton LLP

(57) ABSTRACT

Techniques for auto composing using a transformer-based language model having a parameter sharing decoder pair (PSDP) that reduces a number of parameters of the model and maintains the capability of generating understandable and reasonable compositions. In one particular aspect, a method is provided that includes obtaining a full encoder sequence, and inputting the full encoder sequence into a transformer model having a PSDP. The PSDP includes: a first decoder having parameters that are shared across all N layers of the first decoder; and a second decoder having parameters that are shared across all N layers of the first decoder. The parameters of the first decoder are different from the parameters of the second decoder. The method further includes using the transformer model to predict sequence elements based on the full encoder sequence, generate an output sequence comprising the sequence elements, and output an output sequence different from the full encoder sequence.

14 Claims, 7 Drawing Sheets

(56)                    References Cited

U.S. PATENT DOCUMENTS

| 2019/0287012 A1* | 9/2019 | Celikyilmaz | ......... G06F 16/345 |
| 2019/0354567 A1* | 11/2019 | Dehghani | ............ G06N 3/0895 |
| 2020/0034436 A1* | 1/2020 | Chen | ...................... G06N 3/044 |
| 2020/0117715 A1* | 4/2020 | Lee | .......................... G06N 3/08 |
| 2020/0184020 A1* | 6/2020 | Hashimoto | ............. G06F 40/58 |
| 2020/0302023 A1* | 9/2020 | Bouamor | ............... G06N 3/044 |
| 2020/0342316 A1* | 10/2020 | Shazeer | ................... G06N 3/08 |
| 2021/0055932 A1* | 2/2021 | Patel | .................. H03M 7/6017 |

OTHER PUBLICATIONS

Cho et al., On the Properties of Neural Machine Translation: Encoder-Decoder Approaches, Proceedings of SSST-8, Eighth Workshop on Syntax, Semantics and Structure in Statistical Translation, Oct. 25, 2014, pp. 103-111.
Fan et al., Hierarchical Neural Story Generation, Proceedings of the 56th Annual Meeting of the Association for Computational Linguistics, vol. 1, Jul. 2018, pp. 889-898.
Hochreiter et al., Long Short-Term Memory, Neural Computation, vol. 9, No. 8, Nov. 1997, pp. 1-32.
Jain et al., Story Generation from Sequence of Independent Short Descriptions, Special Interest Group on Knowledge Discovery and Data Mining, Aug. 21, 2017, 7 pages.
Lan et al., Albert: A Lite BERT for Self-Supervised Learning of Language Representations, In Conference Paper at ICLR 2020, Feb. 9, 2020, pp. 1-17.
Liao et al., GPT-Based Generation for Classical Chinese Poetry, Computation and Language, Artificial Intelligence, Sep. 5, 2019, pp. 1-16.
Liu et al., Generating Wikipedia by Summarizing Long Sequences, As a Conference Paper at ICLR 2018, Jan. 30, 2018, pp. 1-18.
Martin et al., Event Representations for Automated Story Generation with Deep Neural Nets, Thirty-Second AAAI Conference on Artificial Intelligence (AAAI-18), Sep. 12, 2017, 9 pages.
Radford et al., Improving Language Understanding by Generative Pre-training, Available Online at: https://s3-us-west-2.amazonaws.com/openai-assets/research-covers/language-unsupervised/language_understanding_paper.pdf, 2018, 12 pages.
Radford et al., Language Models Are Unsupervised Multitask Learners, Available Online at https://d4mucfpksywv.cloudfront.net/better-language-models/language_models_are_unsupervised_multitask_learners.pdf, Mar. 2019, 24 pages.
Roemmele, Writing Stories with Help from Recurrent Neural Networks, AAAI'16: Proceedings of the Thirtieth AAAI Conference on Artificial Intelligence, Feb. 2016, pp. 4311-4312.
Sachan, et al., Parameter Sharing Methods for Multilingual Self-Attentional Translation Models, Sep. 13, 2018, 11 pages, https://arxiv.org/abs/1809.00252.
Wu et al., Google's Neural Machine Translation System: Bridging the Gap Between Human and Machine Translation, Clinical Orthopaedics and Related Research, Oct. 8, 2016, pp. 1-23.
Xiao, et al., Sharing Attention Weights for Fast Transformer, Proceedings of the Twenty-Eighth International Joint conference on Artificial Intelligence, (IJCAI-19), pp. 5292-5298, Jun. 26, 2019.
Zhao; Xu, *Parameter Sharing Decoder Pair for Auto Composing,* Computer Science>Machine Learning, arXiv.org, arXiv:1910.14270v2, Nov. 2, 2019, 4 pages.

* cited by examiner

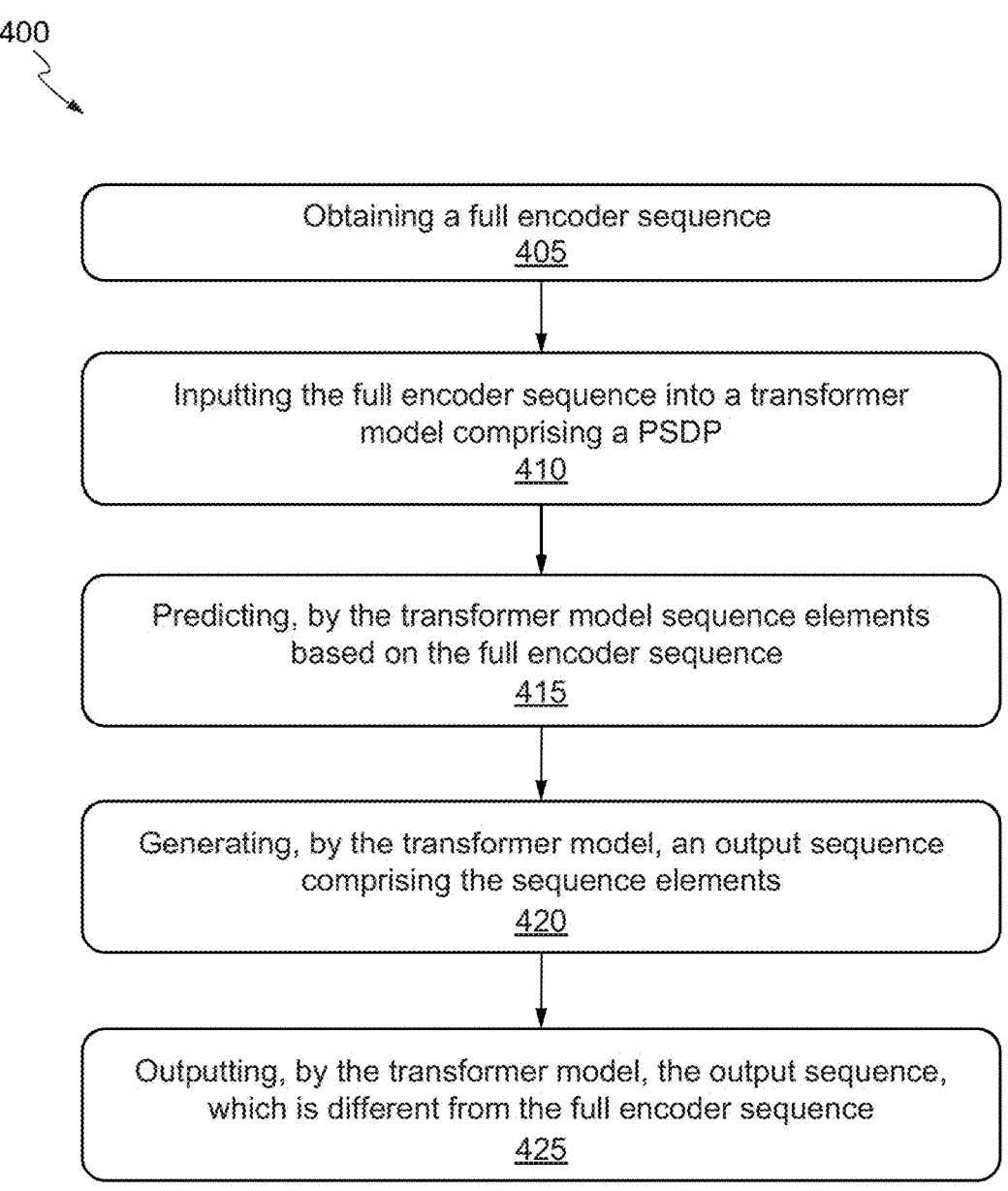

Obtaining a full encoder sequence
405

Inputting the full encoder sequence into a transformer
model comprising a PSDP
410

Predicting, by the transformer model sequence elements
based on the full encoder sequence
415

Generating, by the transformer model, an output sequence
comprising the sequence elements
420

Outputting, by the transformer model, the output sequence,
which is different from the full encoder sequence
425

FIG. 4

PARAMETER SHARING DECODER PAIR FOR AUTO COMPOSING

CROSS-REFERENCE TO RELATED APPLICATION

The present application is a non-provisional application of, and claims the benefit and priority under 35 U.S.C. 119(e) of U.S. Provisional Application No. 62/930,485, filed Nov. 4, 2019. The disclosure of the above-mentioned application is incorporated by reference herein in its entirety.

FIELD

The present disclosure relates to natural language processing, and in particular to techniques for auto composing using a transformer-based language model having a parameter sharing decoder pair (PSDP) that reduces the number of parameters of a model and at the same time maintains the capability of generating understandable and reasonable compositions.

BACKGROUND

Over the past few decades, researchers have developed increasingly advanced artificial intelligence (AI) tools and computational techniques that can be applied in a variety of settings. Among these Natural language processing (NLP) is a technological process that enables computer applications, such as voice assistants, robots and interactive devices, to derive meaning from a user's input and generate written or spoken language. To do this the computer applications attempt to identify valuable information contained in conversations by interpreting the user's needs (intents) and extract valuable information (entities) from a sentence, and respond back in a language the user will understand. One of the most significant challenges when it comes to NLP for computer applications is composing text or spoken language, for example, making the computer mimic a human to generate text or spoken language. Over the years a number of methods have been developed to deal with these challenges. These methods range from traditional statistic machine translation-based models to neural network-based models. Some of these methods have made convincing and promising results.

Compared to other methods, the successful adoption of deep learning in so many different areas has led to more and more interest and efforts being put towards using deep neural networks to design models to deal with this tough composing task. These include the recurrent neural networks like long short-term memory (LSTM), gated recurrent units (GRU) to more recently developed transformer-based language models (transformers). Prior to the introduction of transformers, most state-of-the-art NLP systems relied on gated recurrent neural networks (RNNs), such as the LSTM and GRU, with added attention mechanisms. The transformer built on these attention technologies without using an RNN structure, highlighting the fact that the attention mechanisms alone, without recurrent sequential processing, are powerful enough to achieve the performance of RNNs with attention.

Like the models developed prior to the transformer, the transformer is an encoder-decoder architecture. The encoder comprises a set of encoding layers that processes the input iteratively one layer after another and the decoder comprises a set of decoding layers that does the same thing to the output of the encoder. The function of each encoder layer is to process its input to generate encodings, containing information about which parts of the inputs are relevant to each other. Each encoder layer passes its set of encodings to the next encoder layer as inputs. Each decoder layer does the opposite, taking all the encodings and processes them, using their incorporated contextual information to generate an output sequence. To achieve this, each encoder and decoder layer makes use of an attention mechanism, which for each input, weighs the relevance of every other input and draws information from them accordingly to produce the output. Each decoder layer also has an additional attention mechanism which draws information from the outputs of previous decoders, before the decoder layer draws information from the encodings. Both the encoder and decoder layers have a feed-forward neural network for additional processing of the outputs, and contain residual connections and layer normalization steps. The transformer uses the attention mechanism without being an RNN, processing all tokens at the same time and calculating attention weights between them. The fact that transformers do not rely on sequential processing, and lend themselves easily to parallelization, allows transformers to be trained more efficiently on larger datasets.

BRIEF SUMMARY

The present disclosure relates generally to language processing. More particularly, techniques described herein relate to a transformer-based language model having a PSDP that reduces the number of parameters of a model and at the same time maintains the capability of generating understandable and reasonable compositions. Various inventive embodiments are described herein, including methods, systems, non-transitory computer-readable storage media storing programs, code, or instructions executable by one or more processors, and the like.

In various embodiments, a computer-implemented method is provided comprising: obtaining a full encoder sequence; inputting the full encoder sequence into a transformer model comprising a parameter sharing decoder pair, where the parameter sharing decoder pair comprises: a first decoder comprising N layers, each layer comprising a first masked multi-head attention block and a first feed forward network, wherein parameters of the first decoder are shared across all N layers of the first decoder; and a second decoder comprising N layers, each layer comprising a second masked multi-head attention block and a second feed forward network, wherein parameters of the second decoder are shared across all N layers of the second decoder, and wherein the parameters of the first decoder are different from the parameters of the second decoder; predicting, by the transformer model, sequence elements based on the full encoder sequence; generating, by the transformer model, an output sequence comprising the sequence elements; and outputting, by the transformer model, the output sequence which is different from the full encoder sequence.

In some embodiments, the first decoder does not have a multi-head self-attention block in any of the N layers and the second decoder does not have a multi-head self-attention block in any of the N layers.

In some embodiments, the method further comprises: predicting, by the first decoder of the transformer model, a first set of sequence elements based on the full encoder sequence; predicting, by the second decoder of the transformer model, a second set of sequence elements based on the full encoder sequence; and concatenating, by the transformer model, the first set of sequence elements and the second set of sequence elements to generate a concatenated set of sequence elements, where the output sequence is generated from the concatenated set of sequence elements.

In some embodiments, the predicting the sequence elements comprises for each of the first decoder and the second decoder: (i) generating a decoder input comprising an empty sequence with only a start-of-sequence token on a first position; (ii) predicting a first sequence element of the output sequence based on the full encoder sequence and the decoder input; (iii) filling the first sequence element into a second position of the decoder input sequence, which now has the start-of-sequence token and the predicted first element; and (iv) outputting a new decoder input sequence comprising the start-of-sequence token and the first sequence element, where the output sequence generated from a concatenation of the new decoder input sequence from each of the first decoder and the second decoder.

In some embodiments, the method further comprises iteratively performing steps (ii)-(iv) for each of the first decoder and the second decoder to predict subsequent sequence elements of the output sequence based on the full encoder sequence and the decoder input and output new decoder input sequences comprising the start-of-sequence token, the first sequence element, and the subsequent sequence elements, and where the iterative performance of steps (ii)-(iv) continues until each of the first decoder and the second decoder predicts an end-of-sentence token, which marks an end of the output sequence.

In some embodiments, the parameters of the first decoder and the parameters of the second decoder are learned using a set of training data comprising a plurality of sequences and the learning is based on minimizing an objective or loss function of the transformer model.

In some embodiments, the objective or loss function is constructed to minimize cross entropy between expected outputs and actual final output of the transformer model.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

The foregoing, together with other features and embodiments will become more apparent upon referring to the following specification, claims, and accompanying drawings.

BRIEF DESCRIPTION OF THE DRAWINGS

FIG. 4 shows a process for natural language processing according to various embodiments.

DETAILED DESCRIPTION

Figure 1:
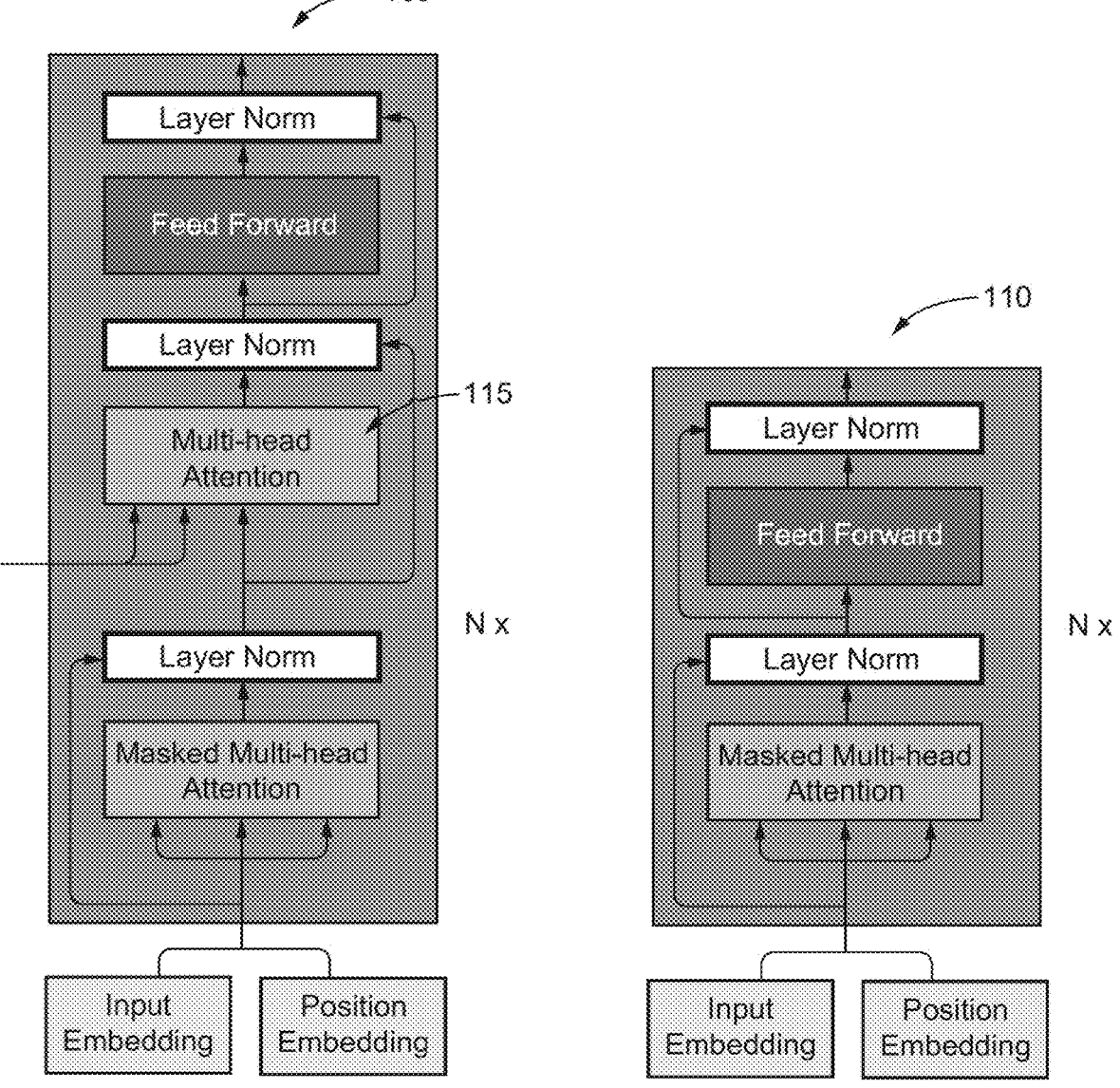
FIG. 1A illustrates an example of a classical transformer decoder.
FIG. 1B illustrates an example of a modified transformer decoder.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

A transformer model is a deep learning model that can take an input (typically sequential data such as natural language text) in the form of a sequence of vectors, and converts the input data into a vector called an encoding, and then decodes the vector back into another sequence. The encoder includes a set of encoding layers that processes the input iteratively one layer after another. Similarly, the decoder includes a set of decoding layers generating an output sequence, using the output of the encoder as an input. The output of the encoder contains latent information from the input sequence that permits the decoder to generate the output sequence. Transformer models may be trained using semi-supervised learning, such as multi-stage training procedures involving unsupervised pre-training followed by supervised fine-tuning. Pre-training may include a much larger training dataset than what is used for fine-tuning, as when labeled training data is less readily available.

Each encoder layer generates encodings from input embeddings. Embeddings are vectors generated from the input vectors by the first encoder layer of the encoder. In the context of structural representations of materials, the inputs could be vector representations of individual nodes or structural characters, such as a letter indicating an element, a bond indicator, a parenthesis, or a punctuation mark. Each encoder layer receives a list of vectors (either the input sentence or an embedding, depending on the position of the encoder layer in the encoder stack) that it processes by passing the vectors into a self-attention layer (multi-head attention), followed by a feed-forward neural network. The output of the feed-forward neural network is passed into the subsequent encoder layer and to the corresponding decoder layer, as described below. The output of the final encoder layer of the encoder is passed to each layer of the decoder. The encodings also contain positional information describing the order of each input vector in the input sequence, such as the position of constituent words in a natural language sentence. The positional information permits the encoder to account for ordering of the sequence components.

The general process undertaken by each self-attention layer includes (i) taking in an input including a list of fixed-length vectors (the input can be an embedding or an encoder output); (ii) splitting the input into a set of query, key, and value matrices by multiplying the input by a set of weight matrices, where each set includes a query weight matrix, a key weight matrix, and a value weight matrix; (iii)

calculating an equivalent number of attention matrices using the query, key, and value matrices for each set of weight matrices; and (iv) concatenating the attention matrices to produce the output of the attention layer. Essentially, multi-head attention uses multiple attention vectors per entry (e.g., word) and takes a weighted average to compute the final attention vector for every entry. The output of the attention layer is a matrix including a vector for each entry in the input sequence (e.g., a sentence). This matrix serves as the input of the feed-forward neural network. Furthermore, at each sub-layer, residual connections and sub-layer normalization operations can be implemented to reduce the difficulty of training the layers.

Decoder layers implement similar structures to those described above in reference to encoder layers. For example, a decoder layer includes a self-attention layer and a feed-forward neural network. The decoder layers take in encodings from the final encoder layer as an input into the self-attention layer, as well as the output of the corresponding encoder layer into an additional encoder-decoder attention layer (e.g., the first encoder layer passes its output to the second encoder layer and the first decoder layer). To focus the decoding layer on the relational structure of the input, the "encoder-decoder attention" layer works just like the self-attention layer of the encoder, except that the query matrices are produced from the preceding decoder layer, while the key and values matrices are produced from the output of the final encoder layer.

For example, similar to the multi-head attention block in the encoder, the decoder's self-attention layer generates attention vectors for every entry to represent how much each entry is related to every entry in the same output sequence. Unlike the multi-head attention block in the encoder that is receiving every entry in the input sequence, only the previous entries of the output sequence are fed into a decoder's masked multi-head attention block. Thus, the entries appearing later are masked using a vector and representing it in zeros, so the decoder's self-attention layer can't use them while performing matrix operations. Additionally, a decoder's multi-head attention block, acts as an encoder-decoder, which receives vectors from the encoder's multi-head attention block and decoder's masked multi-head attention block. The decoder's multi-head attention block will determine how related each word vector is with respect to each other, and this is where the mapping from input to output happens. The output of decoder's multi-head attention block is attention vectors for every entry in input and output sentences, where each vector represents the relationships with other entries in both the input and output sequences. However, the use of both the masked multi-head attention block and multi-head attention block within the decoder significantly increase the overall size and number of parameters of the transformer model, which typically makes the transformer model too large to be used in a production setting for some storage limited applications (e.g., a chatbot deployed on a mobile device).

To address these problems and others, the present disclosure introduces techniques for auto composing using a transformer-based language model having a PSDP that reduces the number of parameters of a model and at the same time maintains the capability of generating understandable and reasonable compositions. One illustrative embodiment of the present disclosure is directed a process comprising obtaining a full encoder sequence; inputting the full encoder sequence into a transformer model comprising a parameter sharing decoder pair, where the parameter sharing decoder pair comprises: a first decoder comprising N layers, each layer comprising a first masked multi-head attention block and a first feed forward network, wherein parameters of the first decoder are shared across all N layers of the first decoder; and a second decoder comprising N layers, each layer comprising a second masked multi-head attention block and a second feed forward network, wherein parameters of the second decoder are shared across all N layers of the second decoder, and wherein the parameters of the first decoder are different from the parameters of the second decoder; predicting, by the transformer model, sequence elements based on the full encoder sequence; generating, by the transformer model, an output sequence comprising the sequence elements; and outputting, by the transformer model, the output sequence which is different from the full encoder sequence.

Conventional Transformer-Based Language Models

Transformer based language models typically only use the transformer decoder (classical decoder). More accurately, transformer based language models typically only use a modified decoder, which contains only the masked multi-head self-attention in each layer. The following provides a brief review of the classical decoder and a comparison between the classical decoder and the modified decoder. In contrast to the classical decoder, the multi-head attention block is removed in the modified decoder, and accordingly the modified decoder uses only the masked multi-head attention block. FIGS. 1A and 1B show a simple visual comparison between a classical decoder 105 and a modified decoder 110. As illustrated, the multi-head attention block 115 of the classical decoder 105 is absent in the modified decoder 110. Consequently, compared to the classical decoder, the modified decoder contains fewer parameters since for each layer it cuts off one attention block (i.e., the multi-head attention block). However, since each layer of the modified decoder has its own parameters, the total parameters for the model are still a lot. A simple calculation shows that with the configuration in Table 1 the entire 12 layers of a modified decoder contain around 85 million parameters.

TABLE 1

Basic configuration of a modified decoder with 12 layers

| Config Name | Config Value |
| --- | --- |
| Word embedding size | 768 |
| Number of attention heads | 12 |
| Size per head | 64 |
| Hidden size | 768 |
| Feedforward network size | 3072 |
| Number of layers | 12 |

Parameter Sharing Decoder Pair (PSDP)

From the above section, it should be understood that a modified decoder with basic configurations usually has a very large number of parameters to learn. This means not only is more effort spent learning the parameters well, but the generated model usually takes a lot of space to store, which makes it a big challenge to some applications where only limited storage is available.

In order to address this issue, various aspects disclosed herein are directed to a new transformer design, which uses a PSDP, to model the data. The PSDP comprises two smaller modified transformer decoders, each transformer decoder having its own set of parameters for both the masked multi-head attention and the feedforward network, with the parameters being shared across all the layers within the transformer decoders. The two smaller transformer decoders are tied together by concatenating their outputs and then another mapping is applied to down-project the combined outputs back to the embedding size. Standard layer normalization as used in each of the attention layers is applied before the final output. The average of the outputs of the two decoders are added in the last layer normalization. Additionally, all the dropouts may be removed from inside the transformer model.

Figure 2:
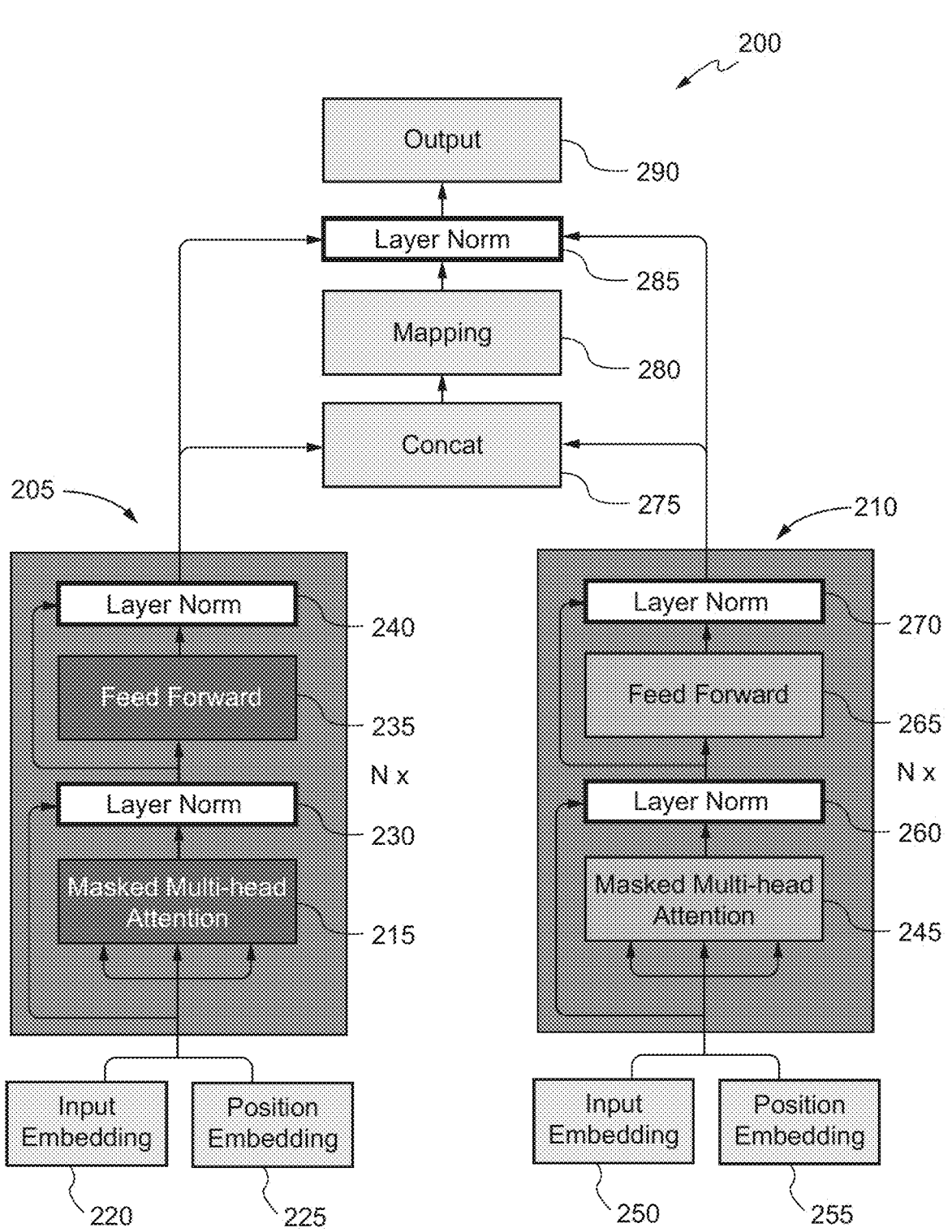
FIG. 2 illustrates an example of a modified transformer having a parameter sharing decoder pair according to various embodiments.

FIG. 2 shows the architecture of a PSDP 200 in accordance with various embodiments. The PSDP 200 includes a first decoder 205 and a second decoder 210. The first decoder 205 comprises a masked multi-head attention block 215 that takes as input an input embedding 220 (e.g., word vectors) and position embedding 225 (e.g., context) and generates an attention output (i.e., a masked output vector with encoded information on how the model should attend on the decoder's input). As discussed herein, the masked multi-head attention block 215 masks the "future" tokens when decoding a certain entity. The input embedding 220 allows each entity (e.g., a word) of a sequence (e.g., a sentence) to be mapped in a high dimensional embedding space, where entities with similar meanings are closer to each other. The positional encoders receive inputs from an input embedding layer and apply relative positional information. The positional encoders output input embedding 220 (i.e., word vectors) with a position embedding 225 (i.e., positional information); that is the entity's meaning and its context in the sequence. The first decoder 205 further comprises a first normalization layer 230 that takes as input the input embedding 220, the position embedding 225, and the attention output of the masked multi-head attention block 215, normalizes the inputs across each of the features, and outputs a first normalization (e.g., compute mean and variance from all of the summed inputs to the neurons in a layer on a single training or deployment case). The first decoder 205 further comprises a feed forward network 235 (e.g., used to project the attention outputs potentially giving it a richer representation) that takes as input the first normalization and generates a feed forward output. The feed forward network 235 is similar to a hidden layer (e.g., a couple of linear layers with a ReLU activation in between) in a regular feed forward network and its parameters are updated by running backpropagation based on transformer loss (output, target) with the target being the output sequence such as a translated sentence or a sentence that completes a composition. The first decoder 205 further comprises a second normalization layer 240 that takes as input the first normalization and the feed forward output of the feed forward network 235, normalizes the inputs across each of the features, and outputs a second normalization (e.g., compute mean and variance from all of the summed inputs to the neurons in a layer on a single training or deployment case).

The second decoder 210 comprises a masked multi-head attention block 245 that takes as input an input embedding 250 and position embedding 255 and generates an attention output (i.e., a masked output vector with encoded information on how the model should attend on the decoder's input). The input embedding 250 allows each entity (e.g., a word) of a sequence (e.g., a sentence) to be mapped in a high dimensional embedding space, where entities with similar meanings are closer to each other. The positional encoders receive inputs from an input embedding layer and apply relative positional information. The positional encoders output input embedding 250 (i.e., word vectors) with a position embedding 255 (i.e., positional information); that is the entity's meaning and its context in the sequence. The second decoder 210 further comprises a first normalization layer 260 that takes as input the input embedding 250, the position embedding 255, and the attention output of the masked multi-head attention block 245, normalizes the inputs across each of the features, and outputs a first normalization (e.g., compute mean and variance from all of the summed inputs to the neurons in a layer on a single training or deployment case). The second decoder 210 further comprises a feed forward network 265 (e.g., used to project the attention outputs potentially giving it a richer representation) that takes as input the first normalization and generates a feed forward output. The feed forward network 265 is similar to a hidden layer (e.g., a couple of linear layers with a ReLU activation in between) in a regular feed forward network and its parameters are updated by running backpropagation based on transformer loss (output, target) with the target being the output sequence such as a translated sentence or a sentence that completes a composition. The second decoder 210 further comprises a second normalization layer 270 that takes as input the first normalization and the feed forward output of the feed forward network 265, normalizes the inputs across each of the features, and outputs a second normalization (e.g., compute mean and variance from all of the summed inputs to the neurons in a layer on a single training or deployment case). The second normalization from each of the first decoder 205 and the second decoder 210 are fed into a concatenation layer 275 and concatenated to generate a concatenation of the normalized outputs from the first decoder 205 and the second decoder 210. The concatenation is then fed into a mapping layer 280 and a subsequent normalization layer 285, which ultimately generate the final output 290 (e.g., an output sequence such as a translated sentence or a sentence of a composition or a natural language response to a question). The optimization objective is to minimize the cross entropy between expected outputs and the actual final output 290 of PSDP 200. In some instances, an Adam optimizer (an adaptive learning rate optimization algorithm that's been designed specifically for training deep neural networks) is used to learn the parameters of the PSDP 200.

As illustrated, each decoder 205; 210 can also be stacked N layers high, each layer taking in inputs from the encoder (if present) and the decoder layers before it. By stacking the layers, the transformer model can learn to extract and focus on different combinations of attention from multiple masked multi-head attention blocks, potentially boosting predictive power of the transformer model. The masked multi-head attention block 215, the first normalization layer 230, the feed forward network 235, and the second normalization layer 240 of each N layer of the first decoder 205 all share parameters across all layers of the decoder 205 and the masked multi-head attention block 245, the first normalization layer 260, the feed forward network 265, and the second normalization layer 270 of each N layer of the second decoder 210 all share parameters across all layers of the decoder 210. The parameters of the first decoder 205 are different from the parameters of the second decoder 210. As should be understood, in PSDP 200, if N (the number of layers per decoder) is set equal to 6, there are a total of 12 layers, but since parameters are being shared, the total number of parameters decreases significantly. For example, using the same configuration as in Table 1, all 12 layers of the PSDP 200 contain around 14.2 million parameters, which is about a 17% reduction in parameters from that of the modified decoder (85 million). It is to be noted that with the same configuration, the PSDP 200 does introduce about 1.18 million additional parameters in the mapping layer 280 after concatenating the normalized outputs from the first decoder 205 and the second decoder 210, but the overall parameter reduction is still considerable.

Computing Environment for Auto Composition

Figure 3:
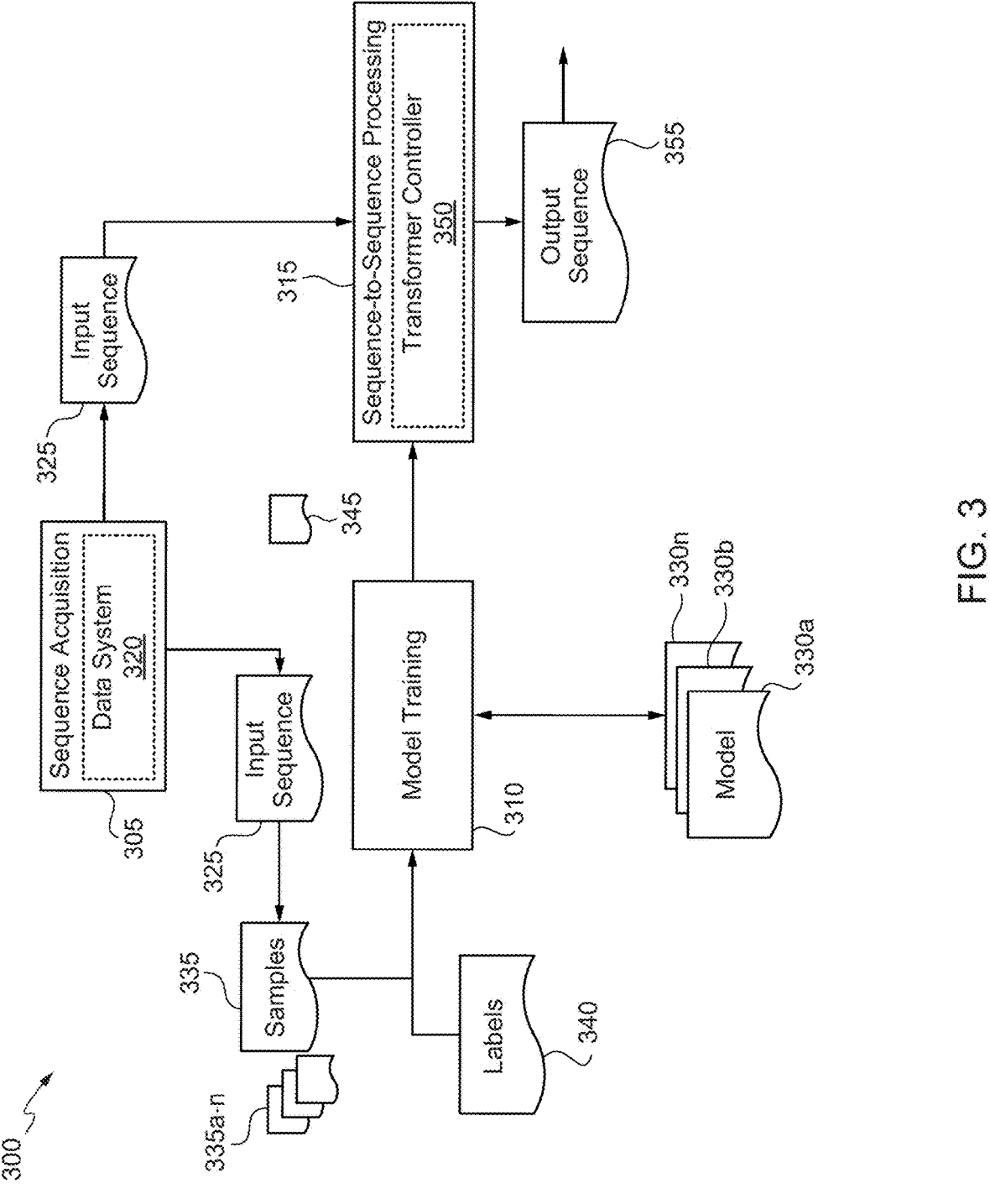
FIG. 3 shows an example computing environment for natural language processing according to various embodiments.

FIG. 3 illustrates an example computing environment 300 (i.e., a data processing system) for natural language processing (e.g., auto composition) according to various embodiments. As shown in FIG. 3, the natural language processing performed by the computing environment 300 in this example includes several stages: an sequence acquisition stage 305, a model training stage 310, and a sequence-to-sequence processing stage 315.

The sequence acquisition stage 305 includes data systems 320 (e.g., a web crawler, search engine, chatbot, email server, database, and the like) for obtaining input sequences 325 (e.g., the sequence of words in sentences, natural language requests, task subjects, and the like). In some instances, the input sequences 325 are subjects of interest that that a user wishes for the auto composer to generate a composition regarding (e.g., next sentence or paragraph prediction, question answering, reading comprehension, sentiment analysis, paraphrasing). In other instances, the input sequences 325 are requests (i.e., utterances) from a user interacting with a chatbot and the chatbot is tasked with determining the intent of the utterances and responding appropriately. In other instances, the input sequences 325 are sentences in a given language that a user wishes to have translated to another language and the auto composer is tasked with the translation. In yet other instances, the input sequences 325 are initial prompts by a user (e.g., a user typing characters or words into an email or word document) and the auto composer is tasked with completing the thought or prompt of the user (e.g., next sentence prediction or auto completing a sentence given the prompt or correcting grammar or spelling of the user).

The model training stage 310 builds and trains one or more models 330*a*-330*n* ('n' represents any natural number) (which may be referred to herein individually as a model 330 or collectively as the models 330) to be used by the other stages. The model 330 can be a machine-learning ("ML") model, such as the transformer model having a PSDP described with respect to FIG. 2. The computing environment 300 may employ the same type of model or different types of models for natural language processing (e.g., auto composition). In some instances, the model 330 will undergo semi-supervised learning involving unsupervised pretraining on a vast amount of data (e.g., leveraging unlimited corpus of text data) followed by supervised fine-tuning using a target data set (domain data). Pretraining is typically done on a much larger dataset than fine-tuning, due to the restricted availability of labeled training data. Tasks for pretraining and fine-tuning may include next sentence prediction, question answering, reading comprehension, sentiment analysis, paraphrasing, and the like.

To train a model 330 in this example, samples 335 are generated by acquiring input sequences (e.g., digital publications, web pages, Wikipedia articles, and the like), splitting the input sequences into a subset of sequences 335*a* for training (e.g., 90%) and a subset of sequences 335*b* for validation (e.g., 10%), preprocessing and/or augmenting the subset of sequences 335*a* (and optionally the subset of sequences 335*b*) and optionally annotating the subset of sequences 335*a* with labels 340. The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. The subset of sequences 335*a* are acquired from one or more sources (e.g., a database, a URL, an email inbox, a document registry, and the like). In some instances, the subset of sequences 335*a* are acquired from a data storage structure such as a database, a data system (e.g., one or more data systems 320), or the like associated with the one or more sequence generating modalities (e.g., a natural language processor such as a chatbot system).

The training process includes selecting hyperparameters for the model 330 and performing iterative operations of inputting sequences from the subset of sequences 335*a* into the model 330 to find a set of model parameters (e.g., weights and/or biases) that minimizes the objective or loss function for the model 330. The hyperparameters are settings that can be tuned or optimized to control the behavior of the model 330. Most models explicitly define hyperparameters that control different aspects of the models such as memory or cost of execution. However, additional hyperparameters may be defined to adapt the model to a specific scenario. For example, the hyperparameters may include the word embedding size, number of attention heads, size per head, number and size of hidden units of a model, number of layers for each decoder, the learning rate of a model, the convolution kernel width, the number of kernels for a model, learning rate, batch size, subvolume size, subvolume selection criteria, feedforward network size, maximum sequence length, and batch composition.

Each iteration of training can involve finding a set of model parameters for the model 330 (configured with a defined set of hyperparameters) so that the value of the objective or loss function using the set of model parameters is smaller than the value of the objective or loss function using a different set of model parameters in a previous iteration. The objective or loss function can be constructed to measure the difference between the outputs inferred using the models 330 and the groundtruths (optionally annotated to the sequences using the labels 340). In some instances, the objective or loss function is constructed to minimize the cross entropy between expected outputs and the actual final output of model 330. In some instances, an Adam optimizer (an adaptive learning rate optimization algorithm that's been designed specifically for training deep neural networks) is used to learn the parameters of the model 330.

Once the set of model parameters are identified, the model 330 has been trained and can be validated using the subset of sequences 335*b* (testing or validation data set). The validation process includes iterative operations of inputting sequences from the subset of sequences 135*b* into the model 330 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of sequences from the subset of sequences 335*b* are input into the model 330 to obtain output (in this example, a sequence of words different from the input sequence), and the output is evaluated versus ground truth sequences using correlation techniques such as Bland-Altman method and the Spearman's rank correlation coefficients and calculating performance metrics such as the error, accuracy, precision, recall, receiver operating characteristic curve (ROC), etc.

As should be understood, other training/validation mechanisms are contemplated and may be implemented within the computing environment 300. For example, the model 330 may be trained and hyperparameters may be tuned on sequences from the subset of sequences 335*a* and the sequences from the subset of sequences 335*b* may only be used for testing and evaluating performance of the model 330. Moreover, although the training mechanisms described herein focus on training a new model 330. These training mechanisms can also be utilized to fine tune existing models 330 trained from other datasets. For example, in some instances, a model 330 might have been pre-trained using sequences of other subjects or other tasks. In those cases, the models 330 can be used for transfer learning and retrained/ validated using the sequences 335.

The model training stage 310 outputs trained models including one or more trained transformer models 345. In some instances, input sequences 325 are obtained by a transformer controller 350 within the sequence-to-sequence processing stage 315. For example, the input sequence 325 may be retrieved from a database or received from input of a user (e.g., an utterance to a chatbot system). The transformer controller 350 using the transformer model 345 is adapted to process the input sequences 325 and predict different output sequences 355. In some instances, the processing the input sequences 325 includes: (i) inputting, into the model 345, a full encoder sequence (e.g., an input sequence 325) and decoder input comprising an empty sequence with only a start-of-sequence token on a first position, predicting, by the model 345, the first element (e.g., word/character) of an output sequence based on the full encoder sequence and the decoder input, and filling the predicted first element into a second position of the decoder input sequence, which now has the start-of-sequence token and the predicted first element in order to provide output of a new decoder input sequence. The processing further includes: (ii) inputting both the full encoder sequence and the new decoder sequence into the model 345, predicting, by the model 345, the second element (e.g., word/character) of the output sequence based on the full encoder sequence and the new decoder input, and filling the predicted second element into a third position of the decoder input sequence, which now has the start-of-sequence token, the predicted first element, and the predicted second element in order to provide output of a new decoder input sequence. The processing further includes: (iii) repeating step (ii) itera- tively predicting each element of the output sequence until the model 345 predicts an end-of-sentence token, which marks the end of the output sequence, and (iv) outputting or providing the final output sequence 355.

While not explicitly shown, it will be appreciated that the computing environment 300 may further include a developer device associated with a developer. Communications from a developer device to components of the computing environ- ment 300 may indicate what types of input sequences are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

Techniques for Auto Composition

FIG. 4 illustrates a flowchart for an exemplary process 400 for using the described transformer models for natural language processing. Process 400 may be performed using one or more computing systems, models, and networks, as described herein with respect to FIGS. 2 and 3.

Process 400 begins at block 405 where a full encoder sequence is obtained. The full encoder sequence may be a sequence of characters or words (e.g., an utterance into a chatbot or a portion of a sentence). In some instances, the full encoder sequence comprises an input embedding and position embedding. The input embedding allows each entity (e.g., a word) of a sequence (e.g., a sentence) to be mapped in a high dimensional embedding space, where entities with similar meanings are closer to each other. The position embedding includes relative positional information.

At block 410, the full encoder sequence is input into a transformer model comprising a PSDP. The PSDP com- prises: a first decoder comprising N layers, each layer comprising a first masked multi-head attention block and a first feed forward network, where parameters of the first decoder are shared across all N layers of the first decoder; and a second decoder comprising N layers, each layer comprising a second masked multi-head attention block and a second feed forward network, where parameters of the second decoder are shared across all N layers of the second decoder. The parameters of the first decoder are different from the parameters of the second decoder. The first decoder does not have a multi-head self-attention block in any of the N layers and the second decoder does not have a multi-head self-attention block in any of the N layers. The parameters of the first decoder and the parameters of the second decoder are learned using a set of training data comprising a plurality of sequences and the learning is based on minimizing an objective or loss function of the transformer model. In some instances, the objective or loss function is constructed to minimize cross entropy between expected outputs and actual final output of the transformer model.

At block 415, sequence elements are predicted, by the transformer model, based on the full encoder sequence. At block 420, an output sequence is generated, by the trans- former model. The output sequence comprises the sequence elements. In some instances, the predicting and generating comprises predicting, by the first decoder of the transformer model, a first set of sequence elements based on the full encoder sequence; predicting, by the second decoder of the transformer model, a second set of sequence elements based on the full encoder sequence; and concatenating, by the transformer model, the first set of sequence elements and the second set of sequence elements to generate a concatenated set of sequence elements. The output sequence is generated from the concatenated set of sequence elements.

In some instances, the predicting and the generating comprises for each of the first decoder and the second decoder: (i) generating a decoder input comprising an empty sequence with only a start-of-sequence token on a first position; (ii) predicting a first sequence element of the output sequence based on the full encoder sequence and the decoder input; (iii) filling the first sequence element into a second position of the decoder input sequence, which now has the start-of-sequence token and the predicted first ele- ment; and (iv) outputting a new decoder input sequence comprising the start-of-sequence token and the first sequence element. The output sequence generated from a concatenation of the new decoder input sequence from each of the first decoder and the second decoder. The steps (ii)-(iv) may be iteratively performed for each of the first decoder and the second decoder to predict subsequent sequence elements of the output sequence based on the full encoder sequence and the decoder input and output new decoder input sequences comprising the start-of-sequence token, the first sequence element, and the subsequent sequence elements. The iterative performance of steps (ii)-

13 14

(iv) continues until each of the first decoder and the second decoder predicts an end-of-sentence token, which marks an end of the output sequence.

At block 425, the output sequence, which is different from the full encoder sequence, is output by the transformer model. The outputting may comprise providing the output sequence to a user or computing device/For example, the output sequence may be displayed to a user, machine spoken to the user, saved in a data store, transmitted to a computing device for downstream processing, and/or the like.

EXAMPLES

The systems and methods implemented in various embodiments may be better understood by referring to the following examples.

The experimental results of using PSDP to generate compositions are provided as follows. In all of the following experiments, a WordPiece tokenizer was used to tokenize the texts. The compositions were generated token by token and at each time point the top K candidates with the highest possibility being selected. One token was then randomly sampled based on their possibility. K was set to be 10 in English tasks and 15 in Chinese tasks. All the training processes were executed in a Tesla P100-SXM2 GPU with 16G memory.

English Compositions Completion

The training data used in this model was the Wikipedia articles with minimal filtering, such as ignoring sentences less than 10 words and removing html tags. The training step was set to be 500,000 and batch size was 8. Table 2 shows the configurations of the model. The trained model was about 300 MB. (The model would be about 1730M MB if the decoders were stacked without sharing parameters.) The training took around 70 hours.

TABLE 2

| Basic configuration of model used in English composition completion | |
|---|---|
| Config Name | Config Value |
| Word embedding size | 1200 |
| Number of attention heads | 12 |
| Size per head | 100 |
| Hidden size | 1200 |
| Feedforward network size | 4800 |
| Number of layers | 12 |
| Maximum sequence length | 128 |

Follows are several compositions generated by the PSDP. For each of these compositions, first a start prompt was provided, and the PSDP was tasked to finish the whole story. An attempt was made to make the generated stories be around 100 tokens and auto-regression was used to generate each token. All the characters have been transformed to lowercase.

Example 1

Start Prompt: Many Species Live in the Jungle
Compositions Generated by PSDP:
many species live in the jungle, and they can be found growing from near—surface to high—altitude. these may include small mammals, birds such as hawks, eagles, kites, herons, and lesser owls. some of these are very rare or endangered species that are threatened by habitat loss. this makes up about 20% of the population (around 40) who live in forest and have a natural range of habitats, there have been several attempts to save the area since the late 19th century.

Example 2

Start Prompt: The Scientists Finally Found the Cave
Compositions Generated by PSDP:
the scientists finally found the cave, and discovered it as a result of the collapse of the ice sheets on earth. they then began to search for the remains. the first known discovery came from a strange hole near the bottom floor of the cave. this finding was discovered by the british geologist, john smith, who described the caves as "a great part of the earth's history". the second discovery was by the australian geological survey (australia), which had concluded that the rock was not a significant part of the cave itself. however, this cave became the site of one of the world's most famous discoveries.

Example 3

Start Prompt: After Graduated from
Compositions Generated by PSDP:
after graduated from the university of california, berkeley, she began writing for the "los angeles times". her first novel was published in 1977, and received numerous honors. "the new york times" described her as "one of the most influential feminist fiction writers in the united states". her novels have been translated into several languages, including spanish, french, english, japanese, portuguese, and italian. she has appeared in many anthologies since the early 1990s. among these are "el amor" (1995), the anthology "el lazar" (2004), and "les ques" (2007).

From the above works, the PSDP demonstrated that it can complete the story with understandable and reasonable sentences. However, due to the random sampling strategy the PSDP may bring in some uncertainties, which may cause the generated compositions to look peculiar. The following phenomena were observed:

In some cases, the generated compositions are not in line with facts. For example, in Example 3, the PSDP says an American writer's novels are translated into English.

Another example is as follows: "deep ocean fishes are mysterious creatures that live in the sea, including the giant" big horn "and various large species of birds such as those from north america." Obviously, birds are not fish and cannot live in the deep ocean.

Sometimes the PSDP may generate repeat chunks like the following paragraph: "the most popular foods available at the factory include chicken soup, chicken soup, and beef meat."

In some cases, two consecutive sentences may not be coherent.

However, overall, the PSDP is capable of completing a quality auto composed paragraph.

Chinese Couplet Completion

In order to further test the composing capability of PSDP, a Chinese Couplet task was attempted. Chinese Couplets have important cultural heritage with a long history in China. A classical couplet usually contains two sentences with the same length. The characters on each line should correspond to each other and furthermore each sentence should follow a special tone pattern.

In the following experiments, unlike two-steps methods, which first pre-train a language model and then do fine-tuning, this model was directly trained on the Couplet dataset. The training data was collected from a public dataset1, which contains around 770,000 couplets in total. Two 12 layers modified decoders were used. All the other configurations are listed in Table 3. The training step was set to be 250,000 and the batch size was 8. The entire training took about 19 hours. The trained model is about 254 MB. (The model would be about 1680 MB if the decoders were stacked without sharing parameters.)

TABLE 3

| Basic configuration of model used in Chinese couplet generation | |
| --- | --- |
| Config Name | Config Value |
| Word embedding size | 1200 |
| Number of attention heads | 12 |
| Size per head | 100 |
| Hidden size | 1200 |
| Feedforward network size | 4800 |
| Number of layers | 12 |
| Maximum sequence length | 64 |

Follows are several Chinese couplets generated by the PSDP. For each of these compositions, The model was provided the first sentence of a couplet and the model was tasked with generating the corresponding second sentence. Several couplets generated by PSDP are shown in Table 4.

From the results it can be determined that due to the random sampling strategy the model can generate diversified second sentences for a fixed first sentence, and the first and second sentences parallel with each other well. However, sometimes the PSDP will generate some unknown words, which makes the couplets look peculiar, but most of the cases the PSDP works well.

TABLE 4

| Chinese couplets generated by PSDP | |
| --- | --- |
| 上联 (the first sentence of the couplet) | 下联 (the second sentence of the couplet) |
| 云罩山间路。(Clouds blanket the mountain path.) | 月勾柳下舟。 (Moon hooks the boat under the willow.) |
| | 日沉水底天。 (Sun's reflection floats in the blue beneath the water.) |
| | 雾封岭上松。(Mist seals the pines on the ridge.) |
| 雨后清风拂嫩草。(Breeze after rain gently caresses tender grass.) | 云中紫燕剪斜阳。(Lilac swallows in the clouds cut through the setting sun.) |
| | 花前细雨润新苗。(Drizzle in front of the flowers moisten sprouts.) |
| | 江中皓月照归舟。(Shining moon over the river illuminates there turning boats.) |
| 十里桃花飘香远。(The scent of peach blossoms wafts out far.) | 一轮红日破雾开。(Red round sunspikes through the fog.) |
| | 千年古木添叶青。(Ancient tree sheds green leaves.) |
| | 一湾碧水映日辉。(Bay of jade water reflects the glow of the sun.) |

Conclusion

Unlike stacking all the attention layers together, the PSDP uses two smaller decoders and shares parameters across all the layers. The generated model employs much fewer parameters and maintains the capability to compose understandable and reasonable compositions at the same time. Experiments on English compositions completion and Chinese Couplet composing were conducted to demonstrate the effectiveness of the proposed method.

Illustrative Systems

Figure 5:
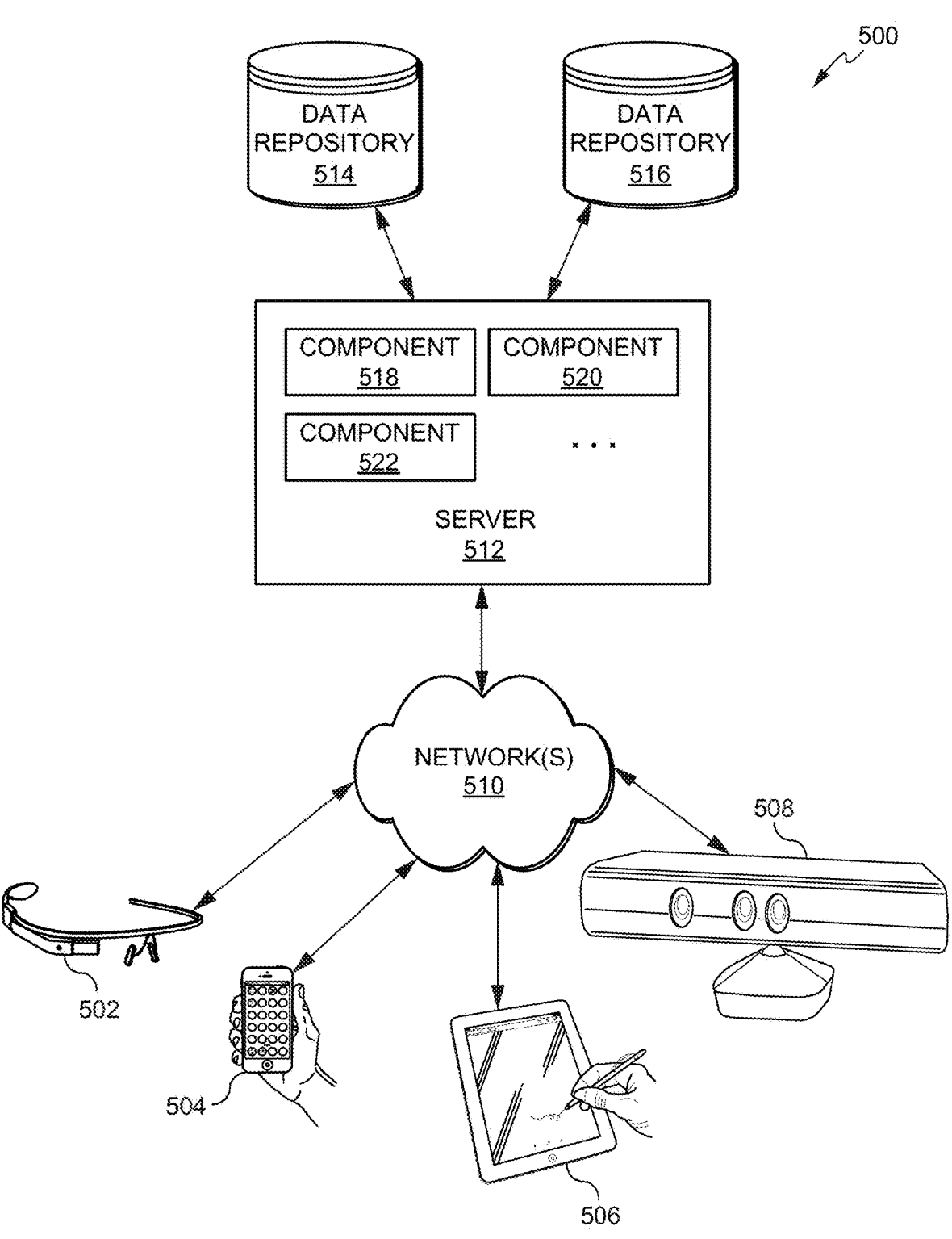
FIG. 5 depicts a simplified diagram of a distributed system for implementing various embodiments.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable natural language processing.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 for natural language processing in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®, tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 510 can be a local area network (LAN), networks based on Ethernet, Token- Ring, a wide-area network (WAN), the Internet, a virtual network, a virtual private network (VPN), an intranet, an extranet, a public switched telephone network (PSTN), an infra-red network, a wireless network (e.g., a network oper- ating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines run- ning virtual operating systems, or other computing archi- tectures involving virtualization such as one or more flexible pools of logical storage devices that can be virtualized to maintain virtual storage devices for the server. In various embodiments, server 512 may be adapted to run one or more services or software applications that provide the function- ality described in the foregoing disclosure.

The computing systems in server 512 may run one or more operating systems including any of those discussed above, as well as any commercially available server oper- ating system. Server 512 may also run any of a variety of additional server applications and/or mid-tier applications, including HTTP (hypertext transport protocol) servers, FTP (file transfer protocol) servers, CGI (common gateway inter- face) servers, JAVA® servers, database servers, and the like. Exemplary database servers include without limitation those commercially available from Oracle®, Microsoft®, Syb- ase®, IBM® (International Business Machines), and the like.

In some implementations, server 512 may include one or more applications to analyze and consolidate data feeds and/or event updates received from users of client comput- ing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network moni- toring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information for natural language processing. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store appli- cation data. The data repositories used by applications may be of different types such as, for example, a key-value store repository, an object store repository, or a general storage repository supported by a file system.

Figure 6:
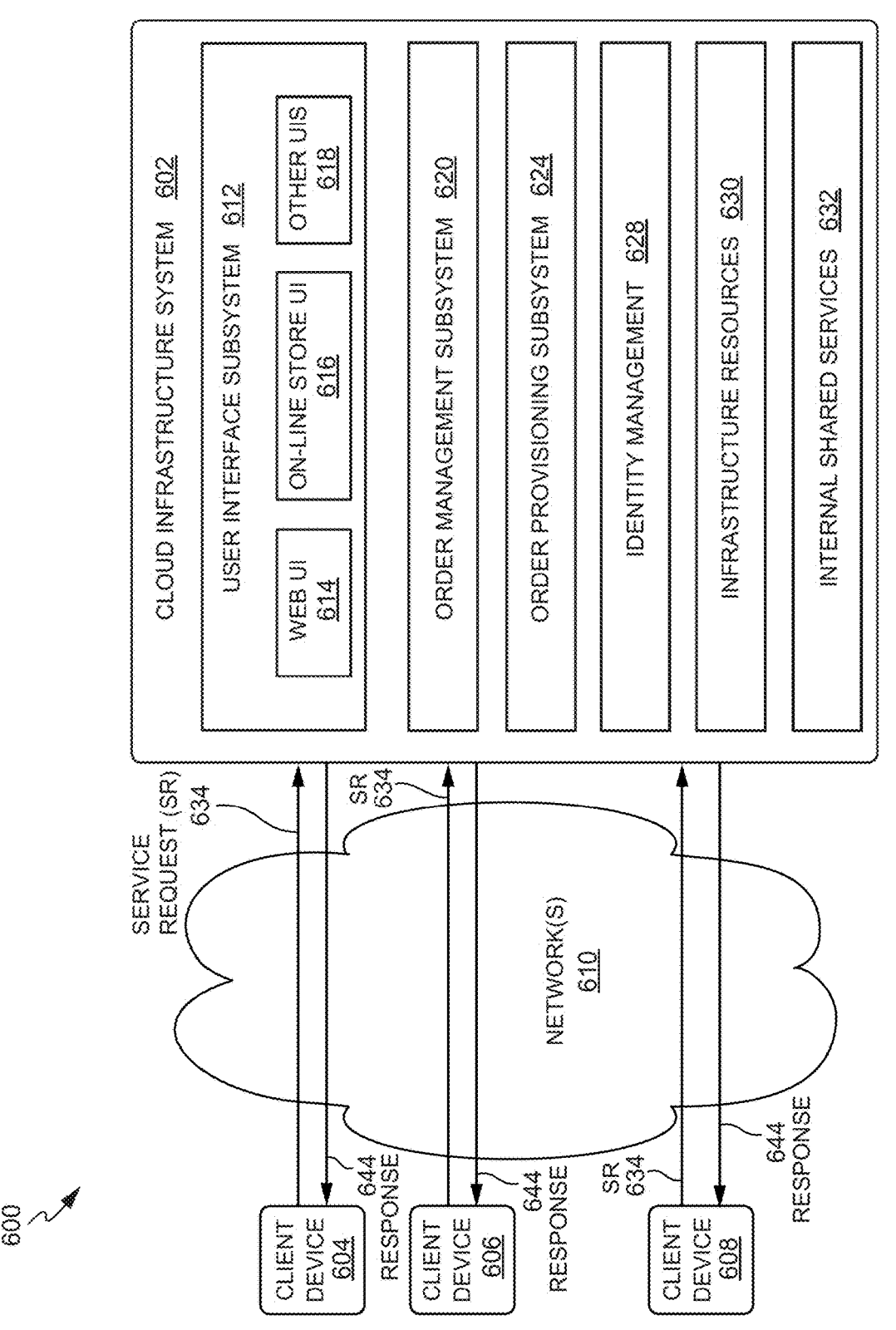
FIG. 6 is a simplified block diagram of one or more components of a system environment by which services provided by one or more components of an embodiment system may be offered as cloud services, in accordance with various embodiments.

In certain embodiments, the natural language processing functionalities described in this disclosure may be offered as services via a cloud environment. FIG. 6 is a simplified block diagram of a cloud-based system environment in which various natural language processing related services may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infra- structure system 602 may comprise one or more computers and/or servers that may include those described above for server 512. The computers in cloud infrastructure system 602 may be organized as general purpose computers, spe- cialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and sys- tems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, sup- port, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Cali- fornia, such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order such as natural language processing. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request a natural language processing related service described in this disclosure.

In some embodiments, the processing performed by cloud infrastructure system 602 for providing natural language processing related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for natural language processing. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a natural language processing related service offered by cloud infrastructure system 602. As part of the order, the customer may provide information identifying a model to be used for natural language processing.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting the natural language processing related service, the response may include deployment of a model Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
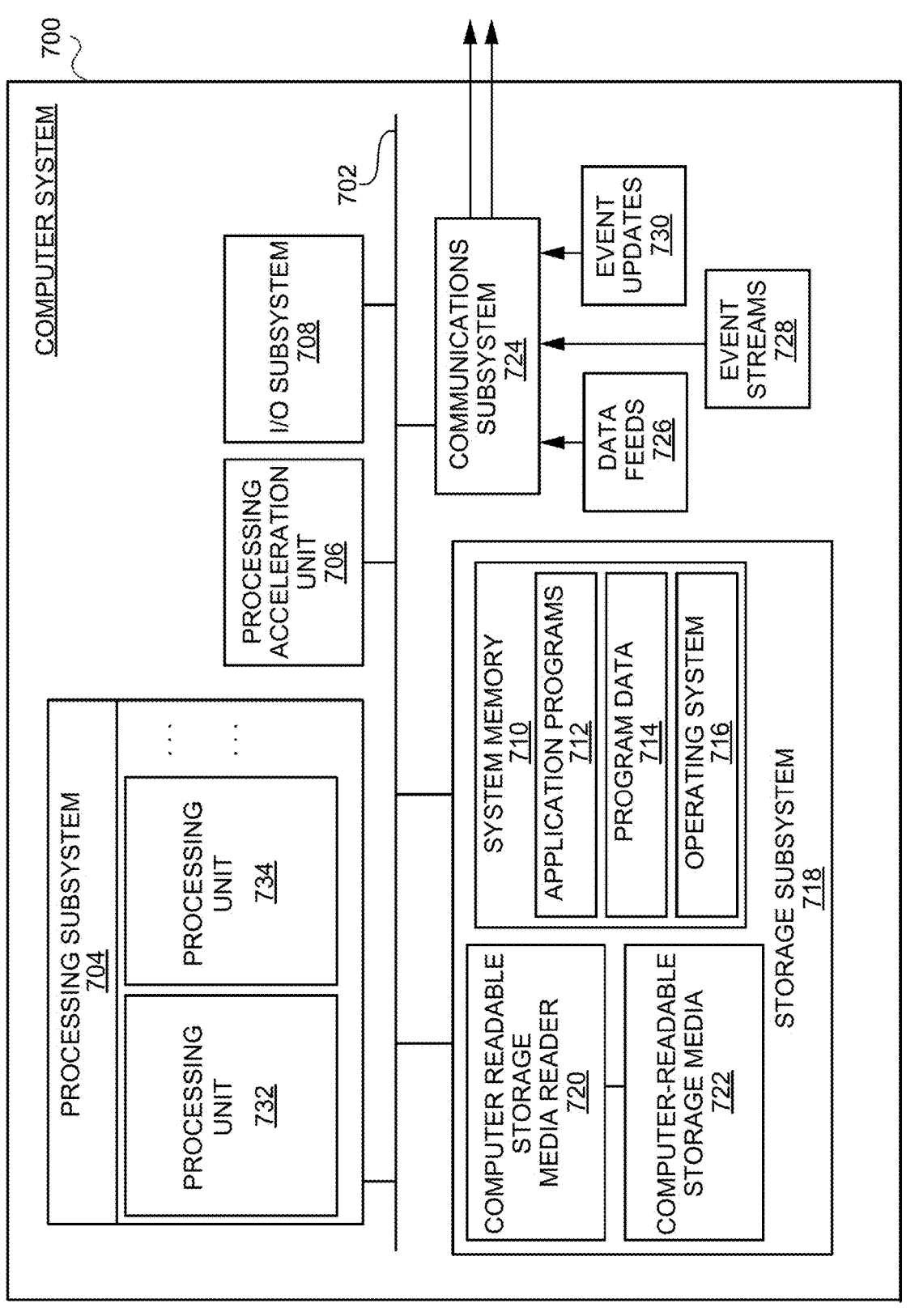
FIG. 7 illustrates an example computer system that may be used to implement various embodiments.

FIG. 7 illustrates an exemplary computer system 700 that may be used to implement certain embodiments. For example, in some embodiments, computer system 700 may be used to implement any of the natural language processing system, natural language processing models, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to receive input for one or more natural language processing models.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:

inputting a full encoder sequence into a transformer model including:
   a parameter sharing decoder pair including a first decoder being input the full encoder sequence and a first decoder input and a second decoder being input the full encoder sequence and a second decoder input, the first decoder and the second decoder performing processing independently from one another, each layer of the first decoder and each layer of the second decoder comprising a single self-attention block,
   a concatenation layer common to and provided at outputs of the first decoder and the second decoder,
   a mapping layer provided at an output of the concatenation layer, and
   a normalization layer provided at an output of the mapping layer;
wherein:
   the first decoder includes N layers, each layer comprising a first masked multi-head attention block and a first feed forward network, the first masked multi-head attention block being the single self-attention block of each layer of the first decoder, wherein parameters of the first decoder are shared across all N layers of the first decoder; and
   the second decoder includes N layers, each layer comprising a second masked multi-head attention block and a second feed forward network, the second masked multi-head attention block being the single self-attention block of each layer of the second decoder, wherein parameters of the second decoder are shared across all N layers of the second decoder, and wherein the parameters of the first masked multi-head attention block of the first decoder are different from the parameters of the second masked multi-head attention block of the second decoder, and the parameters of the first feed forward network of the first decoder are different from the parameters of the second feed forward network of the second decoder;

predicting, by the transformer model, sequence elements based on the full encoder sequence, the predicting comprising:
   predicting, by the first decoder using the first decoder input, a first set of sequence elements based on the full encoder sequence, and
   predicting, by the second decoder using the second decoder input, a second set of sequence elements based on the full encoder sequence, wherein the first set of sequence elements and the second set of sequence elements are the outputs of the first decoder and the second decoder;

concatenating, by the concatenation layer common to the outputs of the first decoder and the second decoder, the first set of sequence elements and the second set of sequence elements to generate a concatenated set of sequence elements;

applying, by the mapping layer, mapping to down-project the concatenated set of sequence elements back to an embedding size;

providing, to the normalization layer as an input, an output of the mapping layer, an average of the first set of sequence elements, and an average of the second set of sequence elements;

generating, by the normalization layer, an output sequence by performing processing and normalizing the provided input, wherein the performing processing and normalizing includes adding, to the output of the mapping layer, the average of the first set of sequence elements and the average of the second set of sequence elements; and outputting, by the transformer model, the output sequence which is different from the full encoder sequence.

2. The method of claim 1, wherein the predicting the sequence elements comprises for each of the first decoder and the second decoder:
   (i) generating a decoder input sequence comprising an empty sequence with only a start-of-sequence token on a first position;
   (ii) predicting a first sequence element of the output sequence based on the full encoder sequence and the decoder input sequence;
   (iii) filling the first sequence element into a second position of the decoder input sequence, which now has the start-of-sequence token and the predicted first sequence element; and
   (iv) outputting a new decoder input sequence comprising the start-of-sequence token and the first sequence element,
   wherein the output sequence is generated based on a concatenation of the new decoder input sequence from each of the first decoder and the second decoder, and
   the decoder input sequence corresponds to the first decoder input for the first decoder, and the second decoder input for the second decoder.

3. The method of claim 2, further comprising iteratively performing (ii) to (iv) for each of the first decoder and the second decoder to predict subsequent sequence elements of the output sequence based on the full encoder sequence and the decoder input sequence, and output new decoder input sequences comprising the start-of-sequence token, the first sequence element, and the subsequent sequence elements, wherein the iterative performance of (ii) to (iv) continues until each of the first decoder and the second decoder predicts an end-of-sentence token, which marks an end of the output sequence.

4. The method of claim 1, wherein the parameters of the first decoder and the parameters of the second decoder are learned using a set of training data comprising a plurality of sequences and the learning is based on minimizing an objective function or a loss function of the transformer model.

5. The method of claim 4, wherein the objective function or the loss function is constructed to minimize cross entropy between expected outputs and actual final output of the transformer model.

6. A system comprising:

one or more data processors; and a non-transitory computer readable storage medium containing instructions which, when executed on the one or more data processors, cause the one or more data processors to perform actions including:

inputting a full encoder sequence into a transformer model comprising a parameter sharing decoder pair including a first decoder being input the full encoder sequence and a first decoder input and a second decoder being input the full encoder sequence and a second decoder input, the first decoder and the second decoder performing processing independently from one another, each layer of the first decoder and each layer of the second decoder comprising a single self-attention block, a concatenation layer common to and provided at outputs of the first decoder and the second decoder, a mapping layer provided at an output of the concatenation layer, and a normalization layer provided at an output of the mapping layer;

wherein:

the first decoder includes N layers, each layer comprising a first masked multi-head attention block and a first feed forward network, the first masked multi-head attention block being the single self-attention block of each layer of the first decoder, wherein parameters of the first decoder are shared across all N layers of the first decoder; and the second decoder includes N layers, each layer comprising a second masked multi-head attention block and a second feed forward network, the second masked multi-head attention block being the single self-attention block of each layer of the second decoder, wherein parameters of the second decoder are shared across all N layers of the second decoder, and wherein the parameters of the first masked multi-head attention block of the first decoder are different from the parameters of the second masked multi-head attention block of the second decoder, and the parameters of the first feed forward network of the first decoder are different from the parameters of the second feed forward network of the second decoder;

predicting, using the transformer model, sequence elements based on the full encoder sequence, the predicting including:

predicting, using the first decoder based on the first decoder input, a first set of sequence elements based on the full encoder sequence, and predicting, using the second decoder based on the second decoder input, a second set of sequence elements based on the full encoder sequence, wherein the first set of sequence elements and the second set of sequence elements are the outputs of the first decoder and the second decoder;

concatenating, using the concatenation layer common to the outputs of the first decoder and the second decoder, the first set of sequence elements and the second set of sequence elements to generate a concatenated set of sequence elements;

applying, using the mapping layer, mapping to down-project the concatenated set of sequence elements back to an embedding size;

providing, to the normalization layer as an input, an output of the mapping layer, an average of the first set of sequence elements, and an average of the second set of sequence elements;

generating, using the normalization layer, an output sequence by performing processing and normalizing the provided input, wherein the performing processing and normalizing includes adding, to the output of the mapping layer, the average of the first set of sequence elements and the average of the second set of sequence elements; and outputting the output sequence which is different from the full encoder sequence.

7. The system of claim 6, wherein the predicting the sequence elements includes for each of the first decoder and the second decoder:

(i) generating a decoder input sequence comprising an empty sequence with only a start-of-sequence token on a first position;

(ii) predicting a first sequence element of the output sequence based on the full encoder sequence and the decoder input sequence;

(iii) filling the first sequence element into a second position of the decoder input sequence, which now has the start-of-sequence token and the predicted first sequence element; and (iv) outputting a new decoder input sequence comprising the start-of-sequence token and the first sequence element, wherein the output sequence is generated based on a concatenation of the new decoder input sequence from each of the first decoder and the second decoder, and the decoder input sequence corresponds to the first decoder input for the first decoder, and the second decoder input for the second decoder.

8. The system of claim 7, wherein the actions further include iteratively performing (ii) to (iv) for each of the first decoder and the second decoder to predict subsequent sequence elements of the output sequence based on the full encoder sequence and the decoder input sequence, and output new decoder input sequences comprising the start-of-sequence token, the first sequence element, and the subsequent sequence elements, wherein the iterative performance of (ii) to (iv) continues until each of the first decoder and the second decoder predicts an end-of-sentence token, which marks an end of the output sequence.

9. The system of claim 6, wherein the parameters of the first decoder and the parameters of the second decoder are learned using a set of training data comprising a plurality of sequences and the learning is based on minimizing an objective function or a loss function of the transformer model.

10. The system of claim 9, wherein the objective function or the loss function is constructed to minimize cross entropy between expected outputs and actual final output of the transformer model.

11. A computer-program product tangibly embodied in a non-transitory machine-readable storage medium, including instructions configured to cause one or more data processors to perform actions including:

inputting a full encoder sequence into a transformer model comprising a parameter sharing decoder pair including a first decoder being input the full encoder sequence and a first decoder input and a second decoder being input the full encoder sequence and a second decoder input, the first decoder and the second decoder performing processing independently from one another, each layer of the first decoder and each layer of the second decoder comprising a single self-attention block, a concatenation layer common to and provided at outputs of the first decoder and the second decoder, a mapping layer provided at an output of the concatenation layer, and a normalization layer provided at an output of the mapping layer;

wherein:

the first decoder includes N layers, each layer comprising a first masked multi-head attention block and a first feed forward network, the first masked multi-head attention block being the single self-attention block of each layer of the first decoder, wherein parameters of the first decoder are shared across all N layers of the first decoder; and the second decoder includes N layers, each layer comprising a second masked multi-head attention block and a second feed forward network, the second masked multi-head attention block being the single self-attention block of each layer of the second decoder, wherein parameters of the second decoder are shared across all N layers of the second decoder, and wherein the parameters of the first masked multi-head attention block of the first decoder are different from the parameters of the second masked multi-head attention block of the second decoder, and the parameters of the first feed forward network of the first decoder are different from the parameters of the second feed forward network of the second decoder;

predicting, using the transformer model, sequence elements based on the full encoder sequence, the predicting including:

predicting, using the first decoder based on the first decoder input, a first set of sequence elements based on the full encoder sequence, and predicting, using the second decoder based on the second decoder input, a second set of sequence elements based on the full encoder sequence, wherein the first set of sequence elements and the second set of sequence elements are the outputs of the first decoder and the second decoder;

concatenating, using the concatenation layer common to the outputs of the first decoder and the second decoder, the first set of sequence elements and the second set of sequence elements to generate a concatenated set of sequence elements;

applying, using the mapping layer, mapping to down-project the concatenated set of sequence elements back to an embedding size;

providing, to the normalization layer as an input, an output of the mapping layer, an average of the first set of sequence elements, and an average of the second set of sequence elements;

generating, using the normalization layer, an output sequence by performing processing and normalizing the provided input, wherein the performing processing and normalizing includes adding, to the output of the mapping layer, the average of the first set of sequence elements and the average of the second set of sequence elements; and outputting the output sequence which is different from the full encoder sequence.

12. The computer-program product of claim 11, wherein the predicting the sequence elements includes for each of the first decoder and the second decoder:

(i) generating a decoder input sequence comprising an empty sequence with only a start-of-sequence token on a first position;

(ii) predicting a first sequence element of the output sequence based on the full encoder sequence and the decoder input sequence;

(iii) filling the first sequence element into a second position of the decoder input sequence, which now has the start-of-sequence token and the predicted first sequence element; and (iv) outputting a new decoder input sequence comprising the start-of-sequence token and the first sequence element, wherein the output sequence is generated based on a concatenation of the new decoder input sequence from each of the first decoder and the second decoder, and the decoder input sequence corresponds to the first decoder input for the first decoder, and the second decoder input for the second decoder.

13. The computer-program product of claim 12, wherein the actions further include iteratively performing (ii) to (iv) for each of the first decoder and the second decoder to predict subsequent sequence elements of the output sequence based on the full encoder sequence and the decoder input sequence, and output new decoder input sequences comprising the start-of-sequence token, the first sequence element, and the subsequent sequence elements, wherein the iterative performance of (ii) to (iv) continues until each of the first decoder and the second decoder predicts an end-of-sentence token, which marks an end of the output sequence.

14. The computer-program product of claim 11, wherein the parameters of the first decoder and the parameters of the second decoder are learned using a set of training data comprising a plurality of sequences and the learning is based on minimizing an objective function or a loss function of the transformer model, and wherein the objective function or the loss function is constructed to minimize cross entropy between expected outputs and actual final output of the transformer model.

* * * * *